Patented Sept. 28, 1937

2,094,545

UNITED STATES PATENT OFFICE 2,094,545

ETHERS OF RESIN ALCOHOLS AND METHOD FOR THEIR PRODUCTION

Edwin R. Littmann, Wilmington, Del., assignor to Hercules Powder Company, Wilmington, Del., a corporation of Delaware No Drawing. Application September 13, 1935, Serial No. 40,397

10 Claims. (Cl. 260—149)

This invention relates to ethyl ethers of resin alcohols, and more particularly to the ethyl ethers of hydrogenated abietyl alcohol and to a method for their production.

The term "resin alcohol" is descriptive of those alcohols, usually primary alcohols, produced by reduction of the hydro-aromatic acids occurring in natural resins. Thus, for example, rosin is composed principally of the hydroaromatic acid, abietic acid, $C_{19}H_{29}COOH$, together with varying amounts of its isomer, pimaric acid. Upon reduction, by suitable methods, of these resin acids, the corresponding resin alcohols may be obtained. Thus, by the reduction of abietic acid, there will be produced, depending upon the particular method employed, abietyl alcohol, $C_{19}H_{29}CH_2OH$, or a hydrogenated abietyl alcohol as, for example, dihydroabietyl alcohol, $C_{19}H_{31}CH_2OH$, and tetrahydroabietyl alcohol, $C_{19}H_{33}CH_2OH$. Reduction of pimaric acid will produce in the same way various pimaryl alcohols or hydrogenated pimaryl alcohols.

Abietyl alcohol may be produced by the reduction of abietic acid or, preferably, an abietic acid ester, such as methyl abietate, by means of sodium in alcoholic solution in accordance with the method described by Ruzicka and Meyer, Helv. Chim. Acta. 5, 581–93 (1932). Similarly, hydrogenated abietyl alcohol may likewise be produced by treatment of hydroabietic acid, or preferably its esters, in the same manner. Hydroabietyl alcohol may likewise be produced by catalytic hydrogenation of abietyl alcohol produced in the manner described above. It is more convenient, however, to produce hydrogenated abietyl alcohol by treatment of abietic acid or its esters or hydrogenated abietic acid and its esters with hydrogen at relatively high pressures and temperatures, and in the presence of a catalyst such as a metal chromite.

It will be understood that the term "hydrogenated abietyl alcohol" is used throughout this specification and in the claims to indicate either dihydroabietyl alcohol, tetrahydroabietyl alcohol, or a mixture thereof. The product actually produced in commercial practice by any of the methods described above for the production of hydrogenated abietyl alcohol is a mixture of dihydro- and tetra-hydroabietyl alcohols in varying proportions.

In accordance with this invention, ethyl ethers of resin alcohols, such as, for example, ethyl ethers of abietyl alcohol, hydrogenated abietyl alcohol, pimaryl alcohol, hydrogenated pimaryl alcohol of the general formula

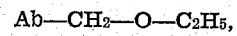

in which Ab stands for the hydrocarbon nucleus of a resin acid, as for example, abietic acid, or the isomeric pimaric acid, hydrogenated abietic acid or the isomeric hydrogenated pimaric acid are produced.

The procedure in accordance with this invention for the production of ethers of the general formula $Ab—CH_2—O—C_2H_5$ is to react a resin alcohol of the general formula $Ab—CH_2—OH$, in which Ab represents the hydrocarbon nucleus of a resin acid with diethyl sulfate in the presence of an alkali metal hydroxide. The resin alcohol used need not be pure and, where a hydrogenated resin alcohol is used, the technical product containing from 50 to 100% hydrogenated resin alcohol may be used directly, although preferably the resin alcohol content should be 75% or over. The resin alcohol may be prepared from a refined or unrefined resin acid, or if desired, may be prepared from a resin acid which has been polymerized by suitable treatment.

In forming an ether, in accordance with this invention, by reacting a mono or dialkyl sulfate with a resin alcohol several alternatives may be used. For example, one mole of hydrogenated abietyl alcohol may be reacted with one mole of a dialkyl sulfate, with or without the presence of an inert solvent in the presence of one mole of an alkali, at a temperature within the range of about $-10°$ C. to about $200°$ C. and with a reaction period of from about 1 hour to about 24 hours. Solvents, such as, for example, benzene, xylene, decalin, gasoline, or the like, may, if desired, be used to lower the viscosity and increase the ease of reaction. The procedure may be modified by using 1 mole or more of a dialkyl sulfate per mole of hydrogenated abietyl alcohol, in the presence of about one mole of alkali, in order to increase the rate of reaction, the products of which are the alkyl ether of hydrogenated abietyl alcohol and the alkali salt of a monoalkyl sulfate. The time and temperature of heating are not critical and can be varied over a substantial range. It has, however, been found preferable to use a temperature within the range of about $100°$ C. to about $125°$ C., and a reaction period of about 7 to 8 hours. After the reaction has been completed, the product is washed with water until neutral, dried and then distilled under reduced pressure, in order to remove the solvents and unreacted alkyl sulfate. The ether, itself, may then be distilled under reduced pressure for further purification, if desired. The technical ethyl ether of hydrogenated abietyl alcohol, containing approximately 85% ether, will be found to boil at about $185°$ C. to $205°$ C. at 2 mm. pressure.

It will be appreciated that the procedure and conditions of reaction described above are merely illustrative of a convenient method for the preparation of these ethers and that both the procedure and the conditions of reaction may be varied widely without affecting the operability of the reaction in question and without departing from the scope of this invention. For example, the inert solvent may or may not be used in the reaction, as desired, and when used may be added in widely varying amounts. It will be appreciated that various inert solvents not named above can be used in place of those named. While the reaction will preferably be carried out at a temperature within the range of about 70° C. to about 150° C., the reaction temperature may be varied, if desired, within the range of about 0° C. to about 250° C., and it will be appreciated that these limits are not critical. The time of reaction will be controlled largely by the temperature of reaction, and the reactivity of the reactants, and will usually be within the range of about 1 hour to about 24 hours.

The following example of the preparation of the ethyl ether of hydrogenated abietyl alcohol will serve to illustrate the practical procedure in accordance with this invention:

A mixture of 25.4 grams (0.081 mole) of crude hydrogenated abietyl alcohol (containing 93% alcohol), 27 grams (0.175 mole) of diethyl sulfate (an excess), and 3.5 grams (0.087 mole) of sodium hydroxide, is warmed in a steam bath with vigorous agitation for about 20 minutes. The reaction begins with a pronounced increase in viscosity, so, soon after the beginning of the reaction 100 cc. of benzene is added to reduce the viscosity, and hence allow efficient agitation. The reaction mixture is then refluxed for about ½ hour after separating solid material. 100 cc. of a 5% solution of sodium hydroxide is then added to the reaction mixture, which is then heated for about 2 hours at the reflux temperature to decompose the excess diethyl sulfate. The reaction mixture is then cooled, and the oil layer separated, washed with water until neutral, and dried. The solvent and unreacted diethyl sulfate are then removed by distillation at reduced pressure. A cut boiling at about 227° C. to 240° C. under a pressure of 15 mm. pressure is taken. A yield of about 30 grams is obtained which gives an analysis of 4.8% ethoxyl, indicating a content of about 36% ethyl ether of hydrogenated abietyl alcohol. The remainder of the product is unreacted hydrogenated abietyl alcohol. This yield can be materially increased by the use of a greater excess of diethyl sulfate, together with higher reaction temperatures and longer heating periods.

The ethers of the resin alcohols in accordance with this invention are valuable for use in the protective coating field, particularly as plasticizers for chlorinated rubber, nitro-cellulose, and cellulose acetate coating compositions.

It will be appreciated that the details and example hereinbefore set forth are illustrative only and are in no way in limitation of the invention as herein broadly described and claimed.

What I claim and desire to protect by Letters Patent is:

1. A compound of the general formula $$Ab—CH_2—O—C_2H_5$$

where Ab stands for the hydrocarbon nucleus of a resin acid.

2. The ethyl ether of hydrogenated abietyl alcohol.

3. The method of preparing an ether which comprises reacting a compound of the general formula $$Ab—CH_2—OH$$

where Ab represents the hydrocarbon nucleus of a resin acid, with diethyl sulfate.

4. The method of preparing an ether which comprises reacting a compound of the general formula $$Ab—CH_2—OH$$

where Ab represents the hydrocarbon nucleus of a resin acid, with diethyl sulfate, in the presence of an alkali metal hydroxide.

5. The method of preparing an ether which comprises reacting hydrogenated abietyl alcohol with diethyl sulfate in the presence of an alkali metal hydroxide.

6. The ethyl ether of dihydroabietyl alcohol.

7. The ethyl ether of tetrahydroabietyl alcohol.

8. The ethyl ether of hydrogenated pimaryl alcohol.

9. The method of preparing an ether which comprises reacting a compound of the general formula $$Ab—CH_2—OH$$

where Ab stands for the hydrocarbon nucleus of a resin acid, with a material selected from the group consisting of monoalkyl sulfate and dialkyl sulfate.

10. The method of preparing an ether which comprises reacting hydrogenated abietyl alcohol with diethyl sulfate in the presence of sodium hydroxide.

EDWIN R. LITTMANN.